United States Patent
Bergholz et al.

(10) Patent No.: US 8,590,127 B2
(45) Date of Patent: Nov. 26, 2013

(54) INSTALLATION AID

(75) Inventors: Sven Bergholz, Tiefenbronn (DE);
Rainer Hennemann, Stuttgart (DE);
Aleksandar Kuridza, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 260 days.

(21) Appl. No.: 13/040,703

(22) Filed: Mar. 4, 2011

(65) Prior Publication Data

US 2011/0219919 A1    Sep. 15, 2011

(30) Foreign Application Priority Data

Mar. 9, 2010   (DE) .................. 10 2010 010 654

(51) Int. Cl.
*B23P 11/02*   (2006.01)
(52) U.S. Cl.
USPC ............... 29/225; 29/270; 29/255; 29/263
(58) Field of Classification Search
USPC ........... 29/225, 226, 227, 229, 235, 244–280
See application file for complete search history.

(56) References Cited

U.S. PATENT DOCUMENTS

| | | | |
|---|---|---|---|
| 2,483,379 A * | 9/1949 | Brell ........................ | 29/229 |
| 2,577,193 A * | 12/1951 | Imse ........................ | 59/7 |
| 3,237,919 A | 3/1966 | MacKay | |
| 3,773,309 A | 11/1973 | Carter | |
| 4,442,580 A | 4/1984 | Antoniadis | |
| 4,516,303 A * | 5/1985 | Kloster ..................... | 29/227 |
| 5,954,314 A * | 9/1999 | Weisshaar ................. | 254/10.5 |
| 6,186,488 B1 | 2/2001 | Lauer | |
| 8,112,856 B2 * | 2/2012 | Huang ...................... | 29/227 |
| 2011/0219919 A1 * | 9/2011 | Bergholz et al. .......... | 81/486 |

FOREIGN PATENT DOCUMENTS

| | | |
|---|---|---|
| DE | 197 51 215 C1 | 12/1998 |
| DE | 10334034 B3 | 10/2004 |
| DE | 10 2006 024 268 A1 | 11/2007 |
| EP | 0500329 A2 | 8/1992 |
| EP | 1498636 A2 | 1/2005 |
| EP | 2 045 044 A1 | 4/2009 |
| JP | 7257132 | 10/1995 |

OTHER PUBLICATIONS

Great Britain Search Report dated Jun. 10, 2011, in related Application No. GB1103424.6.

* cited by examiner

*Primary Examiner* — Lee D Wilson
(74) *Attorney, Agent, or Firm* — RatnerPrestia

(57) ABSTRACT

An installation aid for installing a blocking element on a suspension strut of a motor vehicle, the installation aid having a flexible, Y-like design with a trunk section, a first branch section and a second branch section, wherein the first branch section is longer than the second branch section, a respective eye is arranged at a free end of the trunk section and at a free end of the second branch section, and the eye on the branch section is designed in such a manner that at least regions of the first branch section can be passed there through.

4 Claims, 1 Drawing Sheet

INSTALLATION AID

CROSS REFERENCE TO RELATED APPLICATION

This U.S. patent application claims priority to German Patent Application DE 10 2010010654.2, filed Mar. 9, 2010, which is incorporated by reference herein in its entirety.

FIELD OF THE INVENTION

The present invention relates to an installation aid for installing a blocking element on a suspension strut of a motor vehicle. The invention also relates to a method for blocking a suspension strut of a motor vehicle.

BACKGROUND OF THE INVENTION

DE 197 51 215 C1, which is incorporated by reference, discloses a device for blocking a spring in a suspension strut of a motor vehicle via a spacer element. The spacer element here consists of at least one segment which can be clipped into the spring and is supported by a lower, free end on a positionally fixed spring plate of the suspension strut.

DE 10 2006 024 268 A1, which is incorporated by reference, discloses a further device for blocking a suspension strut of a motor vehicle, the device having a spacer body which is of substantially C-shaped design and can be fitted on a damper device of the suspension strut in a manner engaging around an axial section.

Further devices for blocking a suspension strut of a motor vehicle are disclosed, for example, in U.S. Pat. No. 3,237,919, in U.S. Pat. No. 4,442,580 and in EP 2 045 044 A1, which are each incorporated by reference.

SUMMARY OF THE INVENTION

The present invention is concerned with the problem of being able to bring about, in the simplest possible manner, blocking of a suspension strut of the motor vehicle, the blocking being required for transport of a motor vehicle.

This problem is solved according to the invention by the installation aid and method of using said installation aid that are described herein.

The present invention relates to the general concept of providing an installation aid for installing a blocking element on a suspension strut of a motor vehicle, by means of which installation aid the blocking of the suspension strut can be produced in a simple manner by hand. In this case, the installation aid according to aspects of the invention has a flexible, Y-like design, with a trunk section and a first and a second branch section. The first branch section, in this case, is longer than the second branch section, wherein a respective eye is additionally arranged at a free end of the trunk section and at a free end of the second branch section. The eye on the second branch section is designed in such a manner that at least regions of the first branch section without an eye can be passed there through. By means of this comparatively simple and flexible embodiment, the installation aid can be installed in a simple manner on a suspension strut to be blocked. For this purpose, the two branch sections are firstly placed around a piston rod of a damper device of the suspension strut, to be precise preferably on the end side of an additional spring. The first branch section is subsequently passed through the eye on the second branch section, and the installation aid is grasped at the free end of the trunk section and at the free end of the first branch section. The installation aid is subsequently pulled in the axial direction of the piston rod toward the additional spring, as a result of which the latter is, for example, pulled downward and therefore pretensioned. In this state, the additional spring opens up a space into which a blocking element can be inserted. If the blocking element is inserted, the installation aid can be removed in a simple manner by pulling on the eye of the trunk section and thereby releasing the installation aid from the suspension strut. Since the installation aid is used without being destroyed, said installation aid can be used as a recirculatable part and can be used time and again for blocking a multiplicity of suspension struts.

In an advantageous embodiment of the solution according to aspects of the invention, the eye on the trunk section is designed as a gripping loop. This affords the particular advantage of simplifying the gripping of the installation aid and therefore facilitating the tensioning of the additional spring on the suspension strut. In general, the free end of the first branch section can also have a holding contour, for example a gripping loop or a roughened region, which significantly simplifies the gripping of the first branch section and therefore the installation of the blocking element on the suspension strut.

In a further advantageous embodiment of the solution according to aspects of the invention, the installation aid is formed from plastic, in particular from rubber. A design of this type firstly permits a high degree of flexibility and secondly permits simple handling because of the comparatively low weight. Of course, the plastic and in particular the rubber are configured here in such a manner that the tensile forces required to pull down and to tension the additional spring can be easily absorbed.

Furthermore, the formation of the installation aid made from plastic has the great advantage that the installation aid can be produced cost-effectively as a result.

Further important features and advantages of the invention emerge from the drawings and from the associated description of the figures with reference to the drawings.

It goes without saying that the features mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below, wherein identical reference numbers refer to identical or similar or functionally identical components.

BRIEF DESCRIPTION OF THE DRAWINGS

In the drawings, in each case schematically.

DETAILED DESCRIPTION OF THE PREFERRED EMBODIMENTS

Figure 1:
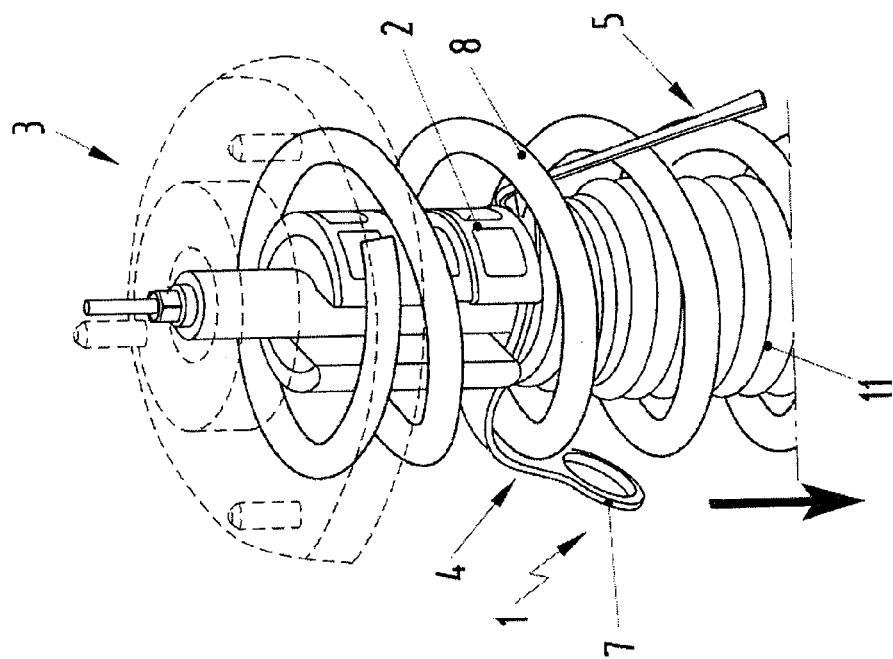
FIG. 1 shows an installation aid inserted into a suspension strut.
Figure 2:
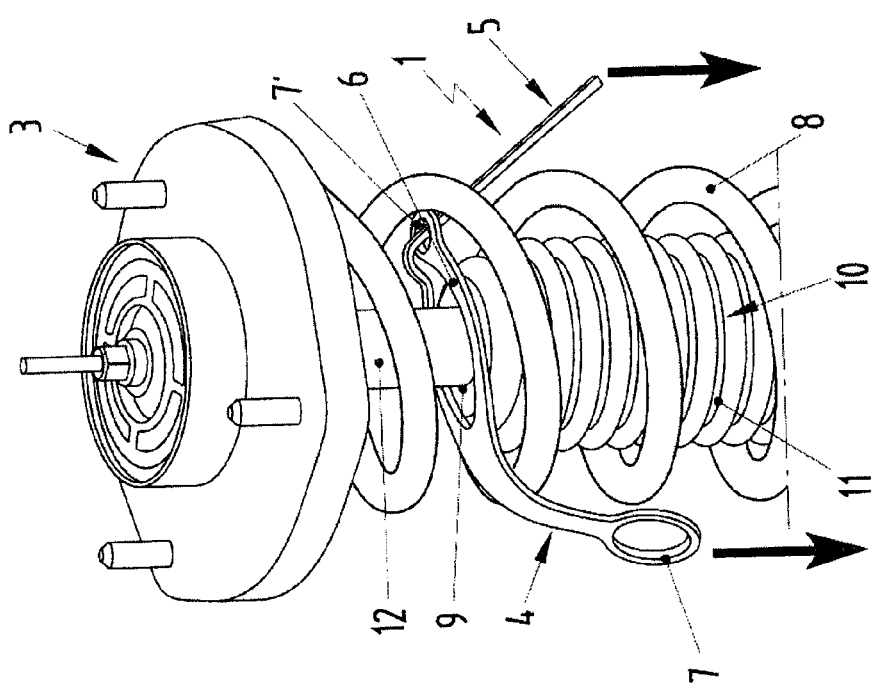
FIG. 2 shows an illustration as in FIG. 1, but with a blocking element additionally introduced into the suspension strut.

Corresponding to FIGS. 1 and 2, an installation aid 1 according to aspects of the invention for installing a blocking element 2 (cf. FIG. 2) on a suspension strut 3 of a motor vehicle—otherwise not illustrated—has a Y-like design with a trunk section 4 and a first branch section 5 and a second branch section 6. In this case, the first branch section 5 is designed to be longer than the second branch section 6, wherein a respective eye 7,7' is arranged at a free end of the trunk section 4 and at a free end of the second branch section 6. The eye 7' on the second branch section 6 is designed in such a manner that at least regions of the first branch section 5 can be passed there through. By contrast, the eye 7 on the trunk section 4 can be designed, for example, as a gripping loop or, in general, as a holding contour. The free end of the first section 5 likewise also has a holding contour, for example a gripping loop (not shown) or else a corresponding roughening. The installation aid per se can be formed from plastic, in particular from rubber, and, as a result, can be produced cost-effectively.

The suspension strut 3 shown according to FIGS. 1 and 2 has at least the following components: a main helical spring 8 which winds around an additional spring 9 and around a damper device 10. The additional spring 9 sits on a piston rod of the damper device 10. The damper device 10 is surrounded here by an expansion bellows 11. The blocking element 2 is installed on the suspension strut 3 by means of the installation aid 1 according to aspects of the invention as follows:

The installation aid 1 is first of all arranged with the branch sections 5 and 6 thereof on the end side of the additional helical spring 9 and in a manner engaging around a piston rod 12 of the damper device 10, as is illustrated according to FIG. 1. In this case, the damper device 10 is designed as a piston-cylinder unit. The first branch section 5 is subsequently passed through the eye 7' on the second branch section 6, and the installation aid 1 is grasped at the free end of the trunk section 4 and at the free end of the first branch section 5 and pulled in the axial direction of the piston rod 12 toward the additional spring 9 such that the additional spring 9 is pulled downward, pre compressed and therefore pretensioned. The blocking element 2 is subsequently inserted into the space opened up by the pulling and tensioning operation, thereby preventing the additional spring 9 from springing back and, as a result, simultaneously blocking the suspension strut 3. The installation aid 1 can finally be pulled off from the suspension strut 3 by pulling solely on the trunk section 4, wherein, during said pulling operation, the first branch section 5 is pulled out of the eye 7' of the second branch section 6. The blocking element 2 can also be removed again in a similar manner.

It is of particular advantage here that tensioning of the additional spring 9 together with the expansion bellows 11 is possible by means of the installation aid 1 without the expansion bellows 11 being damaged in the process. In general, of course, the installation aid 1 can be used for inserting different blocking elements 2 on different suspension struts 3 and, as a result, can be designed in general as a recirculatable part.

The invention claimed is:

1. An installation aid for installing a blocking element on a suspension strut of a motor vehicle, the installation aid having a flexible Y-shaped member defining a trunk section, a first branch section extending from the trunk section, and a second branch section extending from the trunk section, wherein the first branch section is longer than the second branch section, a hole is arranged at a free end of the trunk section and another hole is arranged at a free end of the second branch section, the another hole on the second branch section is designed in such a manner that at least regions of the first branch section can be passed there through.

2. The installation aid as claimed in claim 1, wherein the hole on the trunk section is a gripping loop.

3. The installation aid as claimed in claim 1, wherein a free end of the first branch section has a holding contour.

4. The installation aid as claimed in claim 1, wherein the installation aid is formed from plastic or rubber.

* * * * *